(12) United States Patent
Johnston

(10) Patent No.: US 7,178,477 B2
(45) Date of Patent: Feb. 20, 2007

(54) ADJUSTABLE PILOT'S TOOL FOR MAINTAINING AIRCRAFT ATTITUDE

(76) Inventor: Anthony Johnston, 301 Middlesex Ave., Wilmington, MA (US) 01887

( * ) Notice: Subject to any disclaimer, the term of this patent is extended or adjusted under 35 U.S.C. 154(b) by 115 days.

(21) Appl. No.: 10/921,711

(22) Filed: Aug. 19, 2004

(65) Prior Publication Data

US 2006/0038703 A1    Feb. 23, 2006

(51) Int. Cl.
*G01C 21/04* (2006.01)
*B60K 35/00* (2006.01)

(52) U.S. Cl. .............................. 116/28 R; 116/DIG. 24

(58) Field of Classification Search .............. 116/28 R, 116/DIG. 24; 33/264; 40/591
See application file for complete search history.

(56) References Cited

U.S. PATENT DOCUMENTS

| | | | |
|---|---|---|---|
| 1,419,335 A | | 6/1922 | Webster et al. |
| 2,127,906 A | * | 8/1938 | Esch .......................... 40/651 |
| 2,960,772 A | * | 11/1960 | Seymour ...................... 33/277 |
| 3,199,487 A | * | 8/1965 | Heinkel ..................... 116/28 R |
| 3,434,214 A | * | 3/1969 | Pratt ............................ 33/264 |
| 3,566,826 A | | 3/1971 | Forster |
| 3,706,970 A | | 12/1972 | O'Keefe |
| 4,401,166 A | * | 8/1983 | Brown ........................ 172/430 |
| 4,823,471 A | * | 4/1989 | Van Schaack ............... 33/264 |
| 4,919,214 A | * | 4/1990 | Brown ........................ 172/430 |
| 4,928,393 A | * | 5/1990 | Van Schaack ............... 33/264 |
| 4,974,355 A | * | 12/1990 | Abrams ....................... 40/591 |
| 5,094,001 A | * | 3/1992 | Fraser .......................... 33/264 |
| 5,146,686 A | * | 9/1992 | Brown .......................... 33/264 |
| 6,499,869 B1 | * | 12/2002 | Southworth .................. 362/504 |
| 6,880,255 B2 | * | 4/2005 | Pfuntner ...................... 33/264 |

* cited by examiner

*Primary Examiner*—R. Alexander Smith
(74) *Attorney, Agent, or Firm*—Cesari and McKenna LLP

(57) ABSTRACT

A tool for use by a pilot as a reference for maintaining a desired aircraft attitude is provided. The tool is a simple mechanical tool that can be removably mounted adjacent to an aircraft windshield, in the pilot's field of view. The tool comprises a central shaft upon which at least one marker pin is mounted. The marker pin is slideably coupled to the shaft in such a manner that it can be independently adjusted to provide a reference for the pilot to set up the plane for the correct approach angle and/or attitude for a particular phase of flight. The marker pin is adjustable to achieve, for example, a climb attitude, a best glide attitude, a descent attitude, a level flight attitude and a banking setting such as to maintain the altitude in a bank for example.

8 Claims, 7 Drawing Sheets

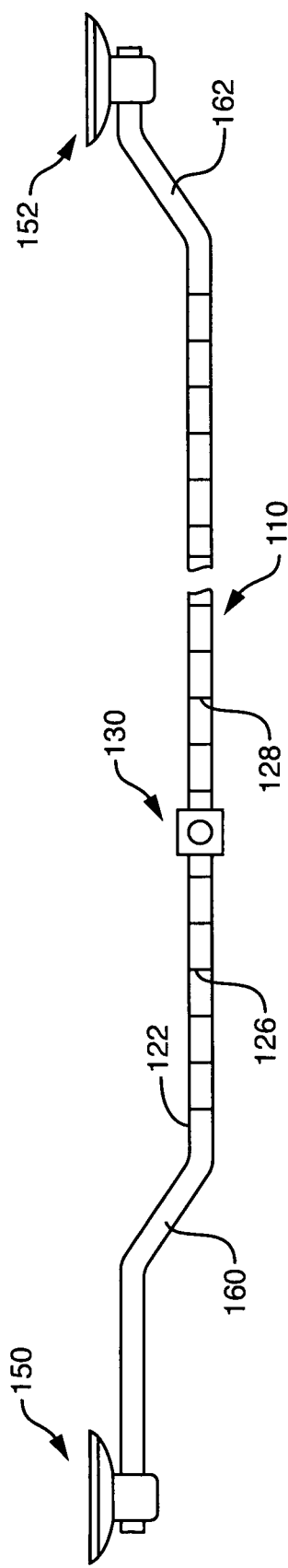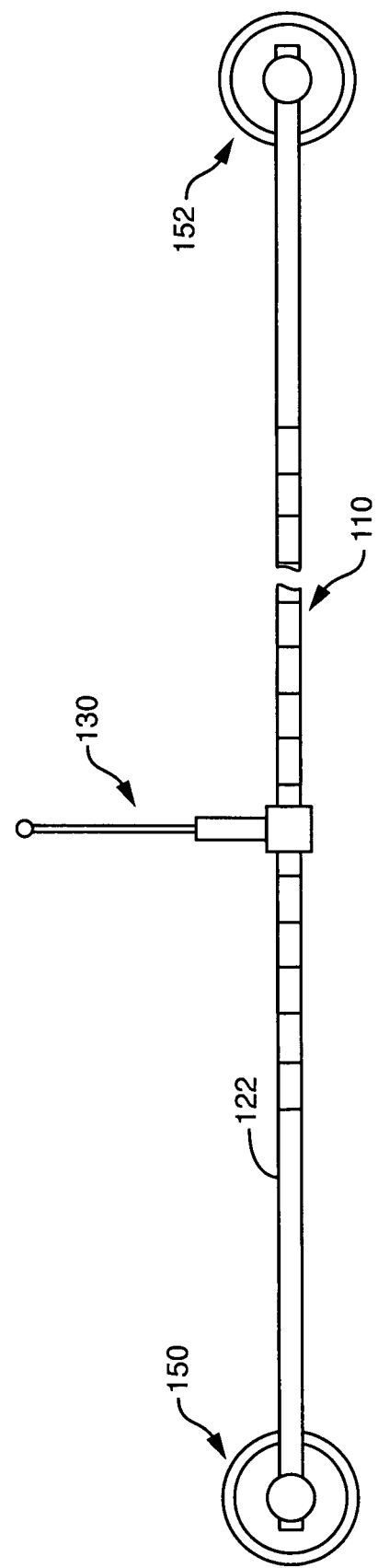

ADJUSTABLE PILOT'S TOOL FOR MAINTAINING AIRCRAFT ATTITUDE

BACKGROUND OF THE INVENTION

1. Field of the Invention

This invention relates generally to the field of aircraft instrumentation and more particularly to mechanical tools for a pilot's visual reference.

2. Background Information

The cockpit of an airplane is a very busy place and learning to fly an airplane requires the development of a complex skill set including aircraft handling and instrument interpretation. One of the many tasks to be performed by a pilot is to maintain the aircraft in a stable attitude during the many different phases of flight. The aircraft attitude is the position of the aircraft determined by the relationship between its three axes and a reference datum such as the horizon. Different phases of flight require different attitudes. For example, an aircraft is maintained at one particular angle with respect to the horizon is in order to maintain a steady climb. And, it may be maintained at a different attitude in level cruise flight and even still a further attitude in a descent. An emergency descent (requiring a steeper angle) is another attitude that must be maintained in those circumstances.

In fair weather conditions, known as VFR (Visual Flight Rules), both student pilots and experienced pilots alike refer to the horizon as a reference point, as does the body. A trick which is used by pilots of all levels and is taught early on in training is to choose a spot on the windshield (most times a dead bug) and line that spot up either with the horizon or at a particular distance from the horizon, (depending on the location of the dead bug) such as two inches below or two inches above, with reference to the actual horizon. This reference helps the pilot to maintain a stable attitude.

Some instrumentation heads-up displays have been designed, which are mounted adjacent the aircraft windshield to provide a display whereby the pilot can simply look straight at the windshield and have the display superimposed in front of him. Many of these devices superimpose an image in the windshield area by using a cathode ray tube or a prismatically projected image that requires certain lenses. This equipment can be very expensive. Such equipment also typically operates on the power supply system of the aircraft. Thus, such equipment could be rendered useless in a power loss during an aircraft's flight.

A mechanical heads-up attitude display was described in U.S. Pat. No. 3,706,970 which is a heads-up artificial horizon instrument that uses as its primary indicator a baton which is positioned in the field of view of a pilot and is coincident with the real horizon, very much the same way the artificial horizon works. The baton is supported from the end of a shaft, which is mounted in an instrument fixture. The instrument fixture includes a series of motors and gyroscopes that are turned and controlled by signals derived from the aircraft motion instruments and such that the baton is moved vertically within the field of view of the pilot.

The aforementioned device, however, is a heads-up attitude display that shows the actual position of the aircraft with respect to the horizon, much the same way the aircrafts instruments do. It does not provide the pilot with information based upon settings that are adjustable during flight, as phases of flight change, depending upon whether the pilot is in level flight, in a climb, in a descent, or attempting to hold an attitude in a banking position.

Furthermore, the heads-up indicator has instrumentation which is responsive to the rolling motions of the aircraft and include the signal producing gyroscopic attitude reference for controlling rotation of the shaft such that the horizon reference baton is continually coincident at all times with the real horizon. However, this signal producing gyroscopic attitude instrumentation can be quite expensive and complex and would most likely be fixed in a particular aircraft. Not only is it complex and thereby expensive, there is a further disadvantage in that many pilots fly rental aircraft and thus would need a tool that is readily removable and mountable in a different aircraft.

There remains a need, therefore, for a simple, mechanical device that can be used as a tool by a pilot for maintaining proper attitude in the various phases of flight at a glance in VFR conditions, while also maintaining his outside visual scan. There remains a further need for a device which is readily adjustable during flight and is simple to use, inexpensive and easily mounted in the pilot's field of view in the aircraft, but which is also removable for later use in a different aircraft.

It is thus an object of the present invention to provide a tool that gives a pilot a target towards which to aim the aircraft in order to achieve and maintain a desired airspeed or attitude in each of the various phases of flight, at the same time keeping his sight out the window as much as possible.

SUMMARY OF THE INVENTION

The disadvantages of prior techniques are overcome by the present invention, which is a simple mechanical tool that can be easily mounted adjacent to an aircraft windshield in a pilot's field of view. The tool comprises a central shaft upon which at least one marker pin is mounted. In accordance with one aspect of the invention, one or more marker pins are attached to the shaft in such a manner that each marker pin can be independently adjusted for use by the pilot as a reference to set up the plane for the different phases of flight. The adjustable marker pins can be color coded such that one color is the marker pin that is set up on the horizon and used for the best glide speed and another color can be used for approach speed, yet another to hold the plane level in a turn. The marker pins are adjustable to achieve, for example, a climb attitude, a best glide attitude, a descent attitude, a level flight attitude, and a banking setting such as to maintain altitude in a turn, for example.

The shaft itself is preferably outfitted with suction cups on one or both ends so that it can be easily mounted to the aircraft windshield and easily removed from the windshield for use in a different plane being flown by the pilot. The shaft is marked in numbered increments which make it easy to track the marker pin position for different phases of flight once the pilot establishes the best settings for that particular airplane and that particular phase of flight. The pilot may then make note of the numbered increment for a particular phase of flight for that aircraft and can use that established setting as a future reference in different phases of flight.

The device of the present invention is mechanical such that it does not require power from the aircraft and is thereby usable during power loss conditions. Furthermore, the device is a simple shaft with one or more stainless steel pins mounted thereupon and it does not require an expensive set of motors, gyroscopes or other instruments.

BRIEF DESCRIPTION OF THE DRAWINGS

The invention will be described with reference to the accompanying drawings, in which:

FIG. 3 is a side elevation of the device of the present invention;

FIG. 4 is a front elevation of the device of the present invention;

DETAILED DESCRIPTION OF AN ILLUSTRATIVE EMBODIMENT

Figure 1:
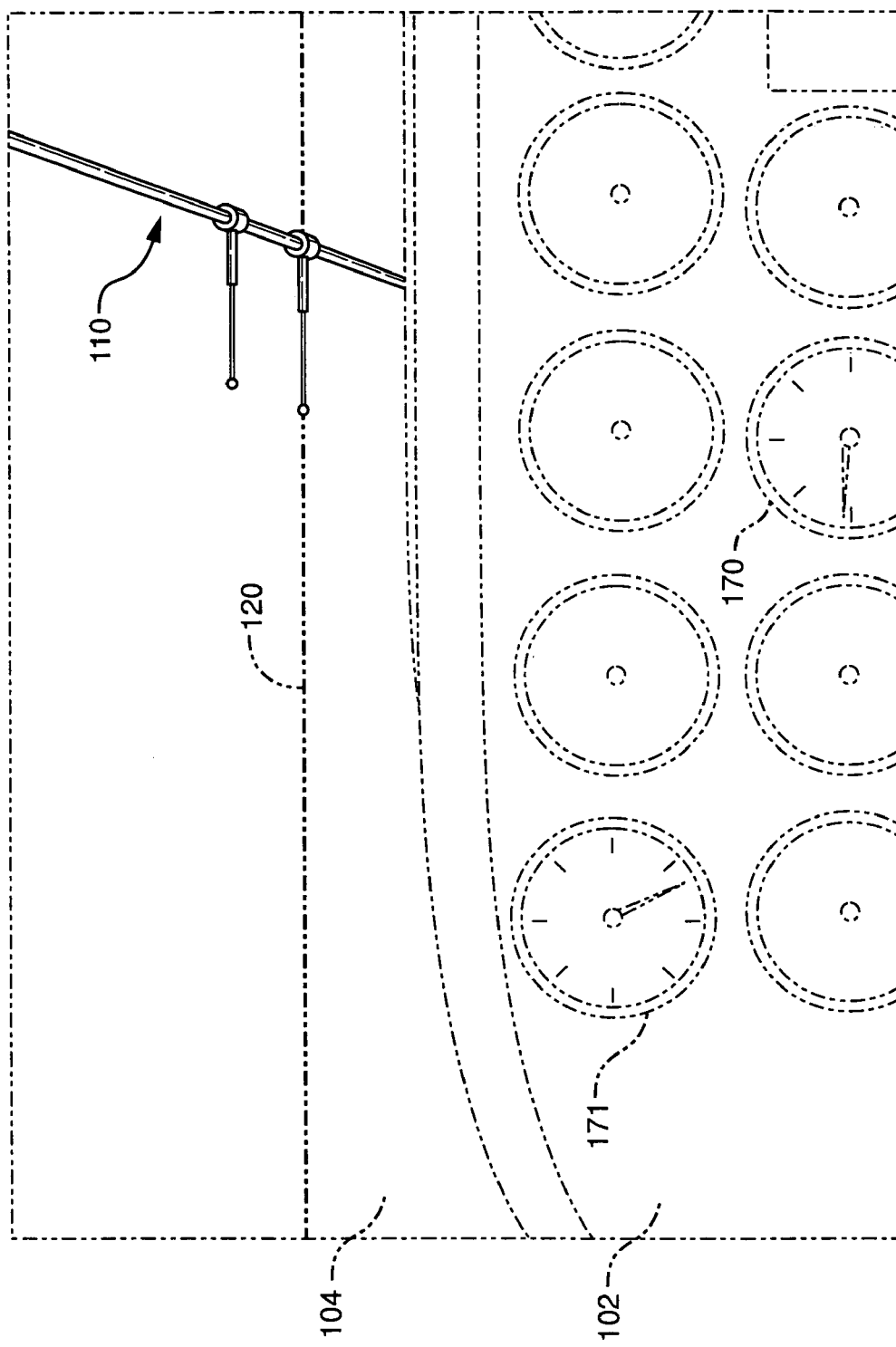
FIG. 1 is a schematic illustration of an aircraft instrument panel and the device of the present invention as located in the pilot's field of view.

FIG. 1 illustrates an aircraft instrument panel 102 and a windshield 104. The device of the present invention 110 is mounted in such a manner that it is centrally located within the pilot's field of view towards the actual horizon 120. It is noted that the aircraft depicted in FIG. 1 is in a level flight attitude. However, prior to discussing the various phases of flight and the settings that can be adjusted in accordance with the present invention, the component parts of the device of the present invention will be described in further detail.

Figure 2:
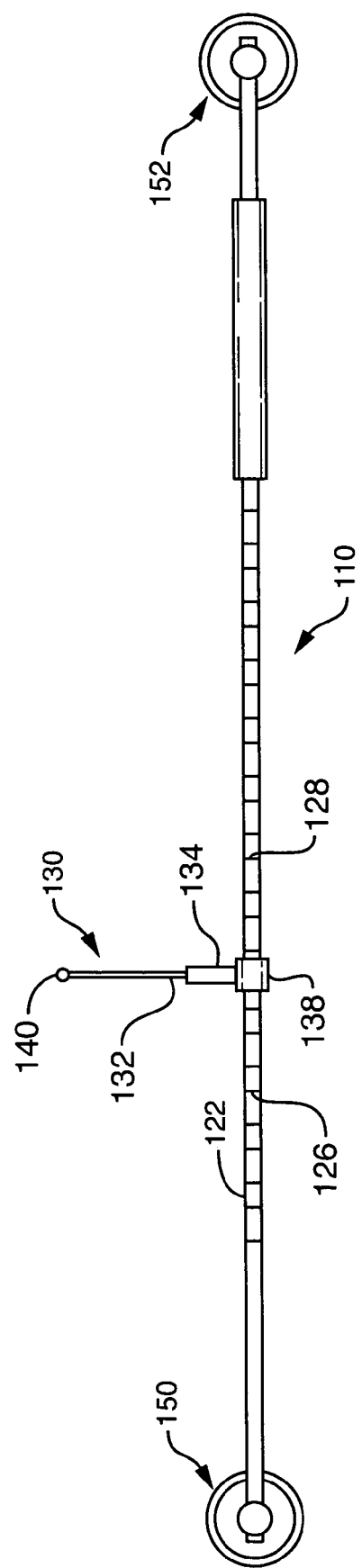
FIG. 2 is a top plan view of the device of the present invention.

FIG. 2 is a top plan view of the device 110 of the present invention. Device 110 is comprised of a centrally located shaft 122. The shaft 122 is etched with identifiers 126, 128, for example, which are provided at spaced increments in order to aid the pilot in using the device 110, as described hereinafter.

A marker pin 130 is comprised of a rod 132, which is mechanically coupled to the shaft 122 by an assembly 134. The mechanical coupling assembly 134 may include a slideable member 138, which has a cylindrical configuration at one end thereof through which is the shaft is threaded and the pin 130 is thus slideable along the shaft 122 in order to adjust the setting. The pin 130 also has a brightly colored endpoint 140, which is readily visible against the outside environment when placed in the pilot's field of view. The device 110 can be attached to the aircraft windshield using removable attachment members 150 and 152, which may comprise of suction cups, for example or other removable attachment elements. It is preferred to provide removable attachment members 150 and 152 so that the device 110 can be used in different aircraft being flown by the particular pilot.

FIG. 3 depicts a side elevation of the device 110 having suction cups for members 150 and 152 at each end of the embodiment of FIG. 3. The slideable pin 130 is set at one of the numbered increments (not visible), similar to increments 126 and 128, as desired in a particular application of the invention. In the embodiment illustrated in FIG. 3, the shaft 122 is bent at curved portion 160 and opposite curved portion 162. This curved configuration allows clearance from the windshield for greater accessibility by the pilot in adjusting the pin settings and for insertion and removal of the device 110 along the windshield of a particular aircraft.

FIG. 4 depicts a top elevation of the device 110 of the present invention illustrating the marker pin 130 located along the shaft 122.

Figure 5:
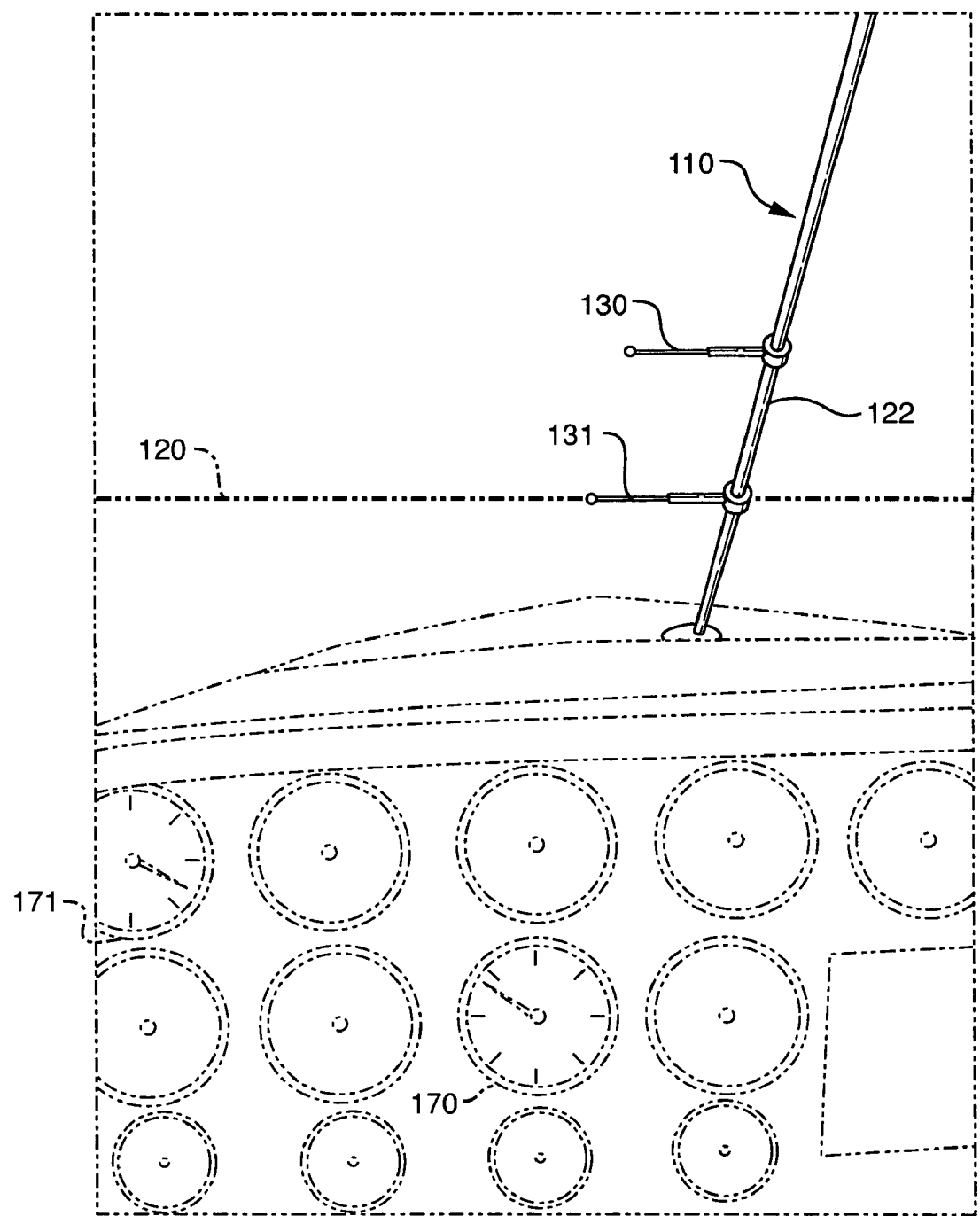
FIG. 5 depicts an aircraft instrument panel and the device of the present invention in a climbing configuration.

FIG. 5 illustrates an embodiment of the device 110 that includes a first marker pin 130 and a second marker pin 131. The marker pins 130 and 131 are slideable along the shaft 122. The adjustable marker pins can be color coded such that one color is the marker pin that is set up on the horizon and referenced for one task and the other another task such as stabilizing an approach by maintaining a constant rate of descent, or maintaining a level banking turn. When a desired setting is established, the marker pins 130, 131 for example, are held in place at the desired increment location by a friction fit.

The illustration of FIG. 5 depicts the aircraft in a climb configuration. In such a configuration, the lower marker pin 131 is set along the actual horizon 120 as viewed by the pilot. This setting is selected as a reference to aid the pilot in achieving a desired angle and rate of climb, thus giving him the desired vertical and airspeed, such as that shown on the vertical speed indicator 170 or the air speed indicator 171. Thus, once the pilot has determined the best climb airspeed by referring to his Pilots Operating Hand Book for that particular aircraft, he or she can achieve that airspeed, set a pin on the horizon, and keep it there to maintain that desired speed Once set it can remain set and can be used in the future without resetting. For instance, if the pilot wants to climb out at what is called vy (best rate of climb) he could use one pin, say pin 130. If he needs to clear an obstacle and needs to climb out at vx (best angle of climb) he could use say pin number 131, all while keeping his sight out the window.

Figure 6:
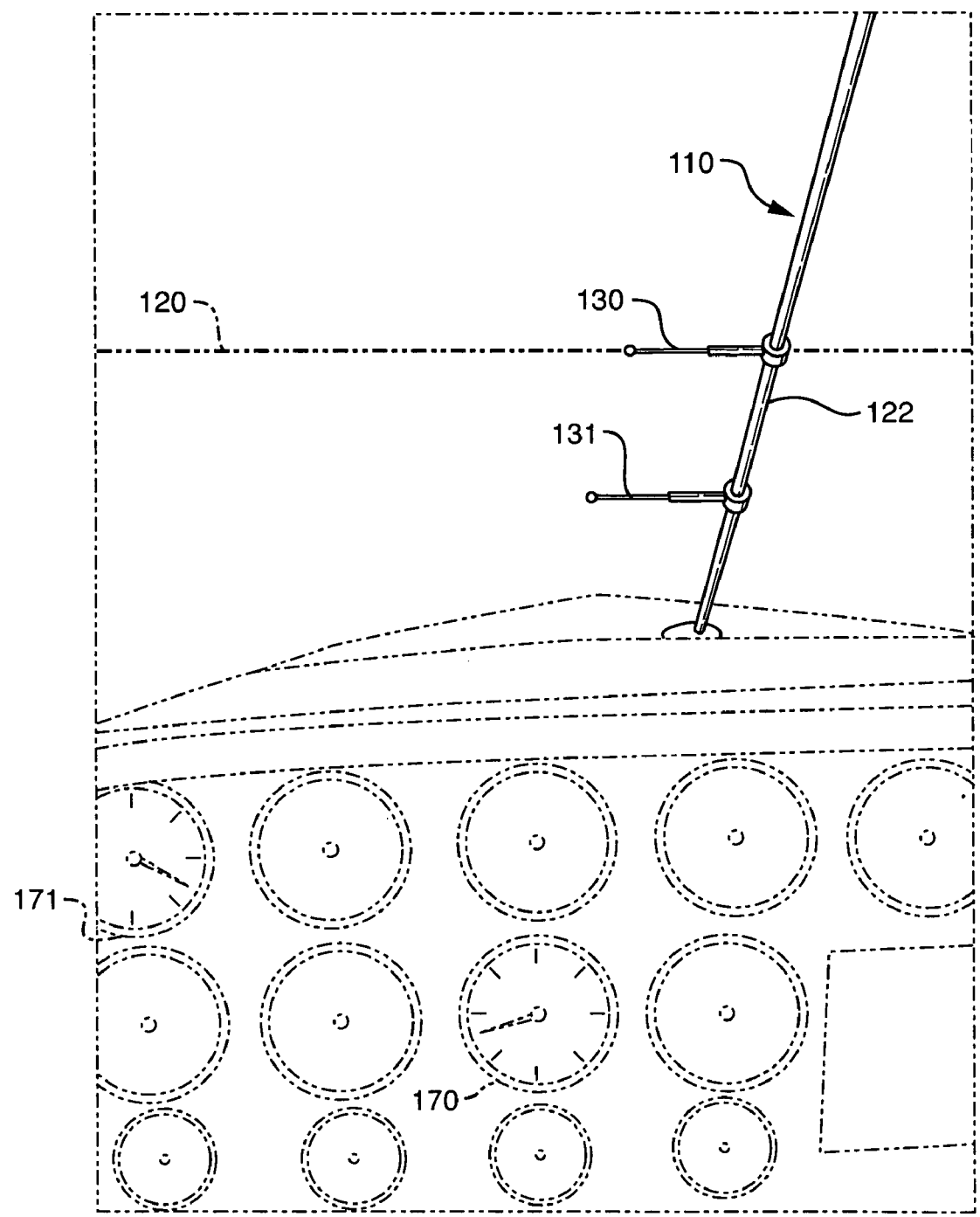
FIG. 6 depicts an aircraft instrument panel and the device of the present invention as set for a best glide configuration.

FIG. 6 depicts the aircraft in a best glide configuration, which is mainly used for engine out glide emergencies and needs to be established immediately upon losing the engine and maintained through out the entire descent. These pins once set can be left and used in the future to instantly setup for best glide. In this instance, the upper marker pin 130 is set at the horizon 120, therefore achieving and easily maintaining best glide speed. While the lower pin 131 is marking the spot to glide to from certain altitudes and there could be many pins representing many altitudes. Because of the position of the device the pilot's vision can be out the windshield scanning for a suitable landing site.

Figure 7:
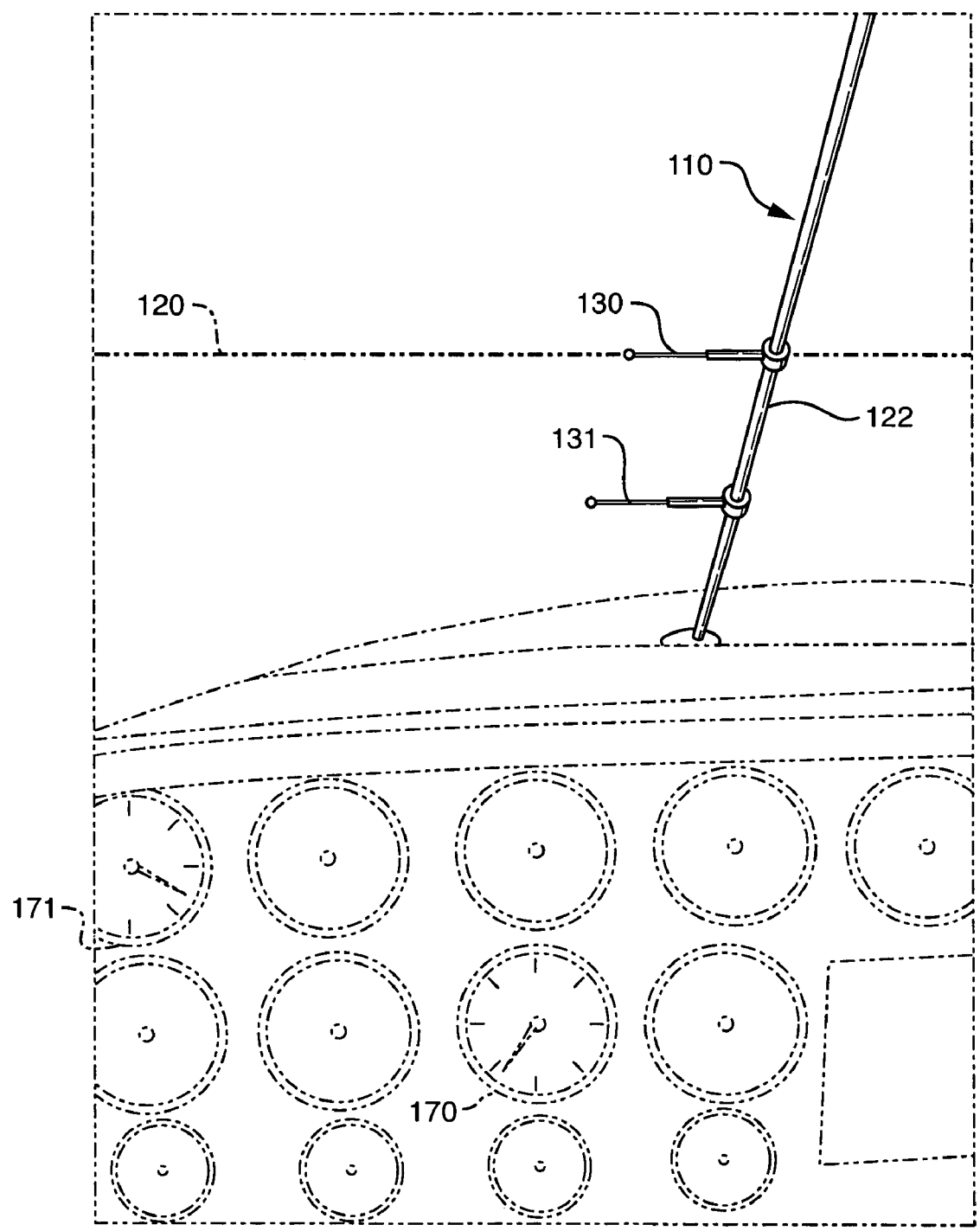
FIG. 7 depicts an aircraft instrument panel and the device of the present invention as set for a descent.

FIG. 7 illustrates the aircraft in a descent in which case the upper mark pin 130 is set at the horizon 120 and this setting could be, for example, the descent airspeed for final approach in which by pulling up on the yoke and raising the nose and lining pin 131 on the horizon 120, the plane is slowed down to short final approach speed. Maintaining the pin on the horizon maintains the desired airspeed.

Figure 8:
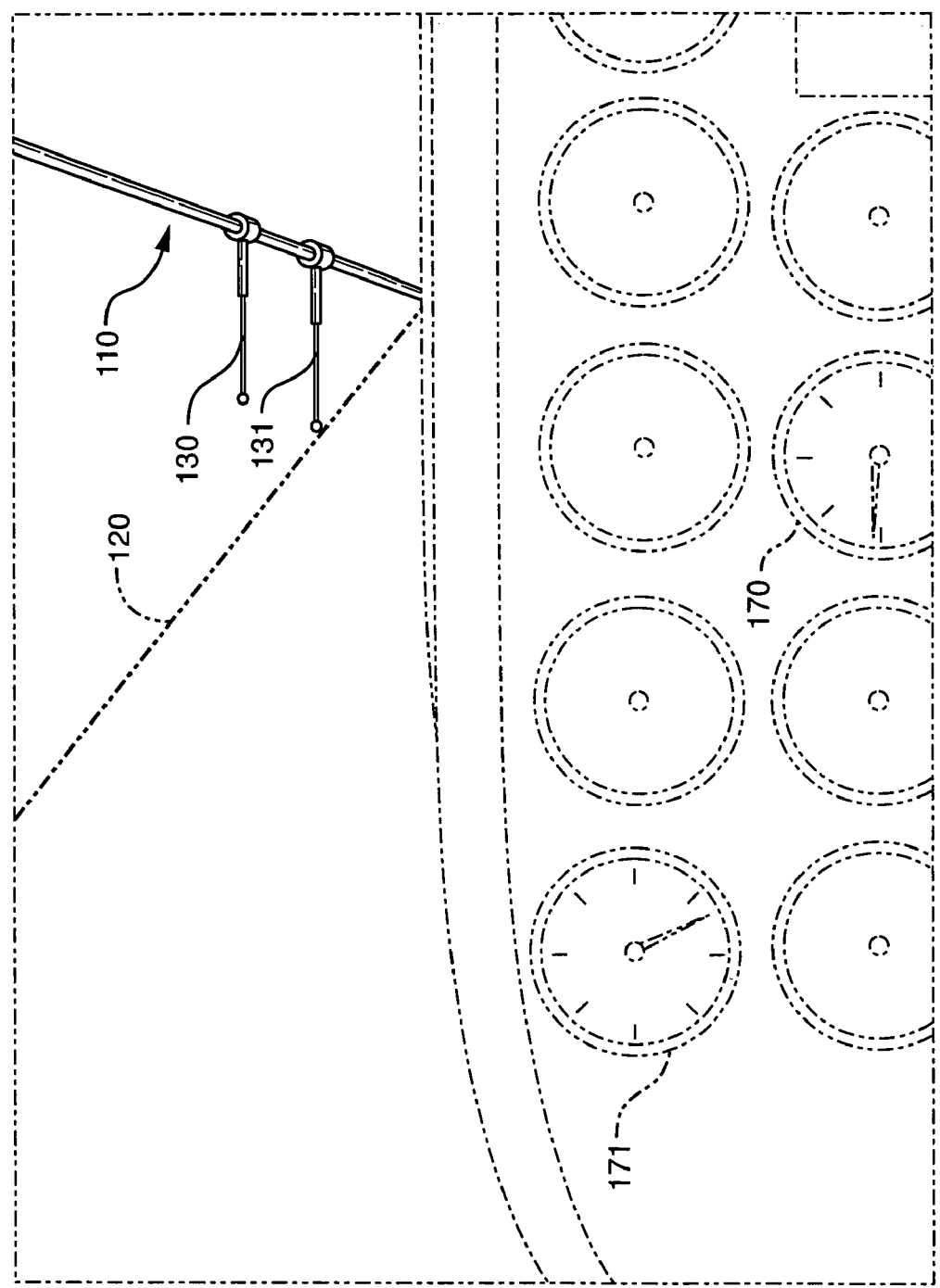
FIG. 8 depicts an aircraft instrument panel and the device of the present investigation set for maintaining altitude in a bank configuration.

FIG. 8 illustrates the aircraft in a banking situation in which the aircraft is making a left turn. It is desirable to maintain a constant altitude while making a turn but this skill can be difficult. The device 110 of the present invention can be used to maintain a level altitude by placing a marker pin 131 such that the endpoint is directly on the horizon and remains on the horizon throughout the turn.

In operation, the pilot can adjust the marker pins "on the fly" as desired for a particular phase of flight. The pilot can then maneuver the aircraft with reference to the marker pins. When the phase of flight changes, the pilot can simply readjust the marker pins 130 and 131 as desired for the new phase of flight, or have several pins permanently fixed for the different phases of flight.

It should be understood that the device 110 of the present invention is a simple mechanical device that is easy to use as a reference tool for a pilot in maintaining a steady aircraft attitude. Furthermore, the device 110 of the present invention is not dependent upon the power supply of the aircraft or any power supply and is thus readily available for use by the pilot in an engine out or power out situation to maintain an emergency descent attitude or a best glide attitude in such critical situations. Moreover, the device is readily removable and can be used in other aircraft should the pilot be flying rental aircraft. Furthermore, the device is of simple construction and thus of significantly lower cost than, for example, head-up displays for an aircraft.

It should be further understood that the device gives a point of reference to the pilot, which is a way to monitor the aircraft in relation to the horizon and helps a student pilot develop some of the very important skills needed. It is also noted that the device can be used with one pin or multiple pins as may be helpful to a pilot in a particular application of the invention.

The foregoing description has been directed to specific embodiments of the invention. It should be apparent that other variations and other modifications may be made to the described embodiments, with the attainment of some or all the advantages of such. Therefore, it is the object of the appended claims to cover all such variations and modifications as come within the true spirit and scope of the invention.

What is claimed is:

1. An adjustable tool for use by a pilot in maintaining a desired aircraft attitude, comprising:
    a mechanical device having a central shaft removably mounted adjacent to an aircraft windshield in a pilots' field of view, and at least one marker pin disposed along said central shaft, and mechanically movable there along such that said marker pin is capable of being manually adjusted by a user with reference to the horizon, in order to aid in maintaining the aircraft in a desired attitude, with reference to the horizon.

2. The adjustable tool as defined in claim 1 further comprising:
    a second marker pin to be used as a reference with respect to the first marker pin in establishing a desired aircraft attitude.

3. The adjustable tool as defined in claim 1 further comprising:
    removable attachment means located on at least one end of said shaft for securing the tool to the windshield of an aircraft.

4. The adjustable tool as defined in claim 3 wherein said attachment means includes a suction cup.

5. The adjustable tool as defined in claim 1 wherein said shaft has a central portion that is bent outwardly to provide clearance for adjusting the marker pin setting or for mounting or removing the tool from the aircraft.

6. The adjustable tool as defined in claim 1 wherein said marker pin has a brightly colored endpoint.

7. The adjustable tool as defined in claim 1 wherein said shaft has markings at spaced increments there along to indicate a predetermined setting for said marker pin at a desired location along said shaft.

8. The adjustable tool as defined in claim 1 wherein said tool requires no electrical power from said aircraft.

* * * * *